Dec. 8, 1959     E. R. BERGMANN ET AL     2,916,099
POWER STEERING SYSTEM FOR SHUTTLE CARS
Filed Oct. 22, 1957     3 Sheets-Sheet 1

INVENTOR.
Ernst R. Bergmann
Joseph J. Slomer
BY
Murray A. Gleeson
ATTORNEY

INVENTOR.
Ernst R. Bergmann
Joseph J. Slomer
BY
Murray A. Gleeson
ATTORNEY

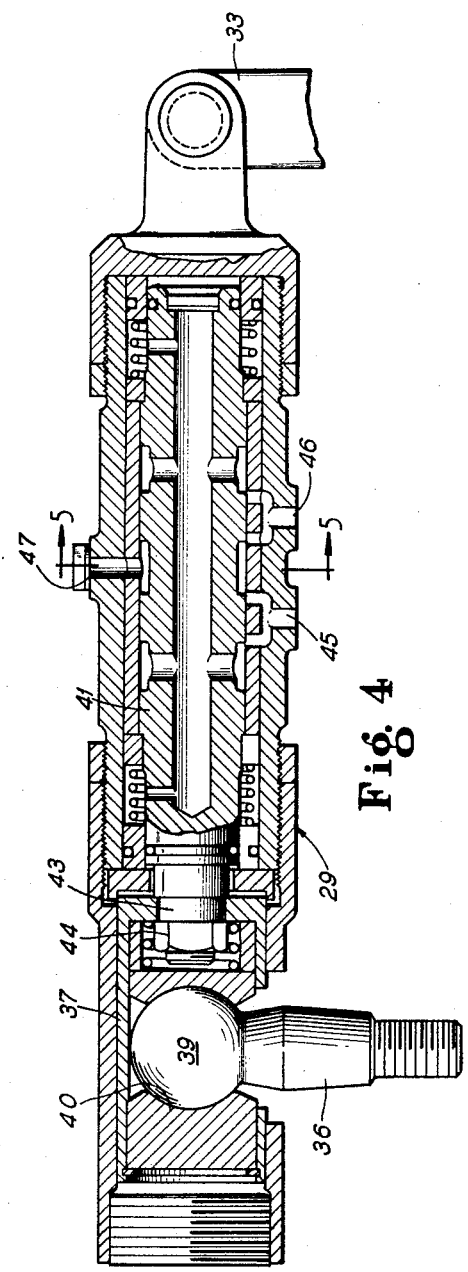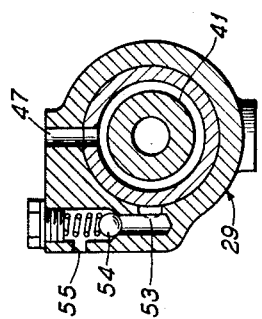

United States Patent Office 2,916,099
Patented Dec. 8, 1959

2,916,099

POWER STEERING SYSTEM FOR SHUTTLE CARS

Ernst R. Bergmann, Evergreen Park, and Joseph J. Slomer, Chicago, Ill., assignors to Goodman Manufacturing Company, Chicago, Ill., a corporation of Illinois Application October 22, 1957, Serial No. 691,563

10 Claims. (Cl. 180—79.2)

This invention relates to improvements in hydraulic systems and more particularly relates to an improved power steering system particularly adapted for shuttle cars and the like.

It has, heretofore, been the practice to mechanically tie the steering wheels on opposite sides of a vehicle together by a tie rod, to correlate steering movement of the two wheels. While tie rods have been satisfactory for vehicles having high road clearance, where the road clearance is low and particularly where the wheel axles are above the bottom of the load carrying part of the vehicle, as in shuttle cars used for transporting coal in mines underground, it has been necessary to provide a complicated tie rod and linkage connection between the steering mechanisms of the two wheels which has greatly increased the cost and maintenance of the steering linkage.

A principal object of the invention is. to remedy the foregoing difficulties by hydraulically correlating steering movement of the steering wheels on opposite sides of vehicles.

A further object of the invention is to provide a simplified and improved hydraulic system particularly adapted for steering in which the conventional tie rod is replaced by a hydraulic tie system effecting movement of the steering wheels together and automatically making up for loss of hydraulic fluid in the hydraulic system.

A still further and more detailed object of the invention is to provide a simplified form of hydraulic steering system particularly adapted for shuttle cars and the like, in which the front steering wheels of the shuttle car are mechanically independent of each other and are actuated for steering by independent hydraulic actuating devices, and in which steering movement of the wheels is correlated by hydraulically tying the actuating devices together to effect steering movement of the steering wheels on opposite sides of the vehicle and by automatically making up for the loss of hydraulic fluid leaking by the hydraulic actuating devices to maintain the wheels in synchronism.

These and other objects of the invention will appear from time to time as the following specification proceeds and with reference to the accompanying drawings wherein:

Figure 4 is a sectional view taken through a conventional form of power steering valve; and Figure 5 is a fragmentary sectional view showing the relief valve in the power steering valve housing.

Figure 1:
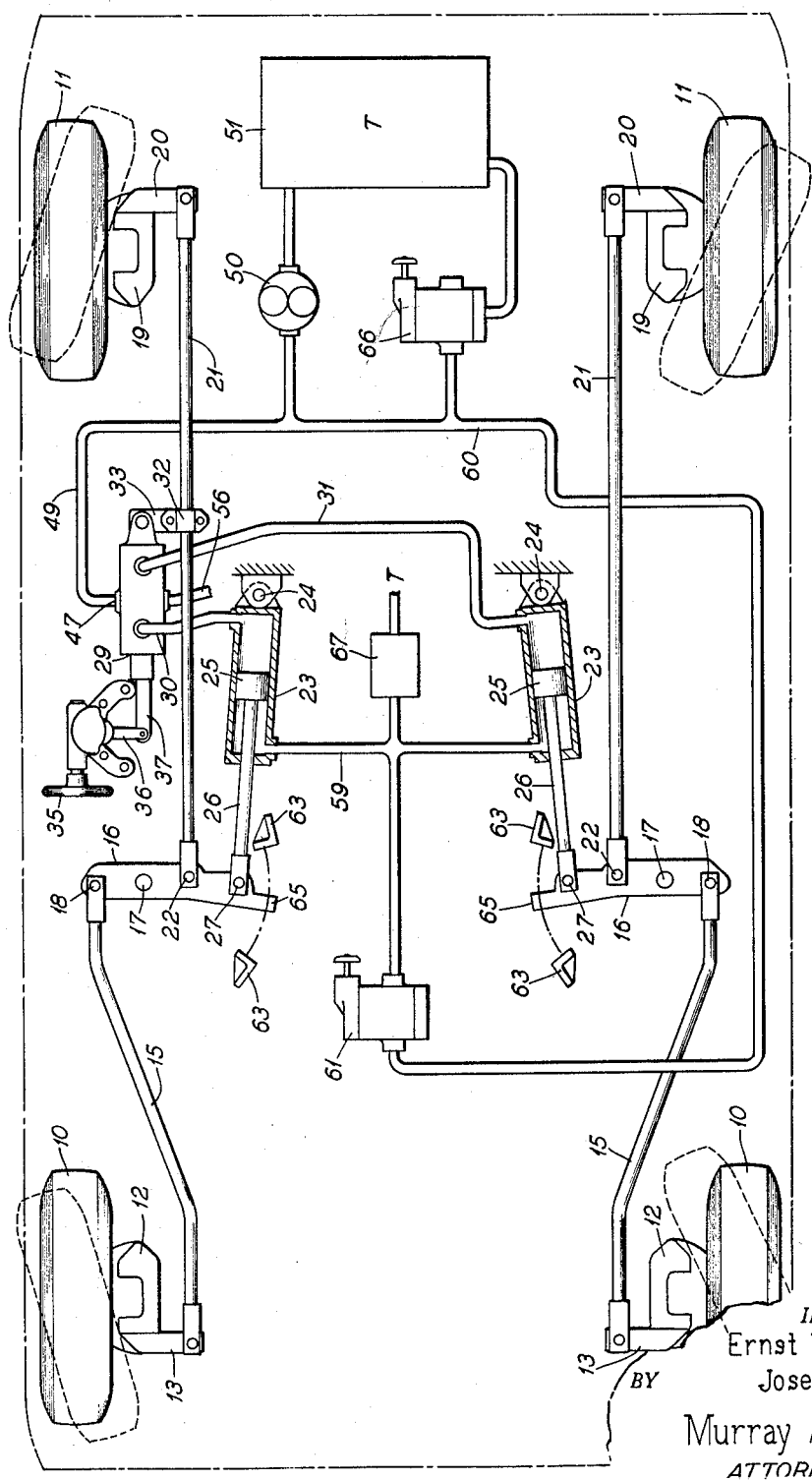
Figure 1 is a diagrammatic view schematically illustrating a power steering system particularly adapted for shuttle cars and the like, showing the hydraulic system at rest.

In the embodiment of the invention illustrated in the drawings, I have shown in Figure 1 an exemplary form of fluid pressure system for turning the front wheels 10 and rear wheels 11 of a vehicle, such as a shuttle car operable in mines underground, for steering the vehicle.

The front wheels 10 are mounted on the usual spindles, diagrammatically illustrated and generally designated by reference character 12, having crank arms 13 extending inwardly therefrom and having steering links or rods 15 pivotally connected thereto. The steering links 15 are pivotally connected at their rear ends on pivot pins 18 to steering levers 16 pivoted to the vehicle body (not shown) at 17, for turning the front wheels 10 for steering upon rocking movement of the steering levers 16.

The rear wheels 11 are likewise mounted on spindles diagrammatically illustrated and generally designated by reference character 19 having crank arms 20 extending inwardly therefrom and connected to the steering levers 16 by steering links 21 pivotally connected to the steering levers 16 on pivot pins 22. Each pivot pin 22 is on the opposite side of the pivot 17 of the steering lever 16 from the pivot pin 18 and is spaced the same distance from the pivot 17 as the pivot pin 18 is spaced from said pivot, to effect movement of the front wheels 10 and the rear wheels 11 equal angular distances in opposite directions upon pivotal movement of said steering lever.

Each steering lever 16 is rocked about its pivot 17 by an individual hydraulic actuating device, herein shown as including a cylinder 23 pivotally mounted adjacent its head end to the vehicle frame for movement about the axis of a pivot pin 24 spaced rearwardly of the head end of said cylinder. Each cylinder 23 has a piston 25 therein having a piston rod 26 extensible from the head end of the associated cylinder and pivotally connected at its forward end to the steering lever 16 on a pivot pin 27, spaced inwardly of the point connection of the steering link 21 to said steering lever.

Fluid under pressure is supplied to the head end of either the right or left cylinder 23 under the control of a steering valve 29 having fluid connection with the right and left cylinders through pressure lines 30 and 31, respectively. The steering valve 29 is shown as being fastened to the steering link 21 for movement therewith by a clamp 32 clamped to said steering link, and a bracket 33 extending from said clamp. A steering wheel 35 is provided to operate the steering valve 29 and is diagrammatically shown as rocking a stud 36 having pivotal connection with an operating member or stem 37 for the valve.

As shown in Figure 4, the stud 36 has a ball 39 on its inner end having bearing engagement with a socket 40 carried within the operating member 37, and connected with a spool 41 for the valve through a stud 43, projecting from the end of said spool, and a nut 44 threaded on said stud and retaining the operating member 37 thereto.

The steering valve 29 is shown as being a conventional 4-way steering valve of the spool type having pressure ports 45 and 46 having fluid pressure connection with the respective pressure lines 30 and 31, and having an inlet pressure port 47 having connection with a pressure line 49 connected with a source of supply of fluid under pressure, such as a pump 50 and a fluid storage tank 51 supplying fluid to said pump.

The valve 29 also has a return passageway 53 connected to the tank 51 through a relief valve 54 and a tank passageway 55 having a return line 56 connected thereto and communicating with the tank 51 for returning hydraulic fluid thereto. The relief valve 54 accommodates the return of fluid under pressure from the head end of one cylinder 23 as pressure is supplied to the head end of the opposite cylinder 23 as a predetermined pressure is built up in the return passageway 53, which may be in the order of 50 p.s.i.

As the steering wheel is turned to rock the ball stud 36, hydraulic fluid will flow to the head end of one cylinder to effect rocking movement of the steering lever 16 and turning of the wheels 10 and 11 on one side of the vehicle. Since the valve 29 moves with the steering link 21, as the valve body overtakes the spool 41, the valve will close and steering movement of the wheels will stop. Continued movement of the steering wheel 35 will, however, keep the valve 29 open and continue turning of the front and rear wheels in direct proportion to the amount the steering wheel has been turned, as is customary with such steering systems.

The pump 50 delivers oil to the 4-way valve 29 through the pressure line 49, and when the valve 29 is in a neutral position said valve will bleed hydraulic fluid under pressure to one side of each cylinder 23 through the pressure lines 30 and 31, and will also bleed hydraulic fluid back to tank through the check or relief valve 54, and tend to maintain a column of hydraulic fluid on each piston 25, which may be of the order of 50 p.s.i. When the steering valve 29 is actuated by turning movement of the steering wheel 35, the spool 41 will move to completely open one cylinder to the pressurized hydraulic fluid and the other cylinder to tank, causing one piston to move in a forward direction and move a column of hydraulic fluid ahead of it. Hydraulic fluid under pressure is supplied from the forwardly moving piston to move the opposite piston in a rearward direction an equal amount through a tie tube 59 connecting the piston rod ends of the cylinders 23 together.

Figure 2:
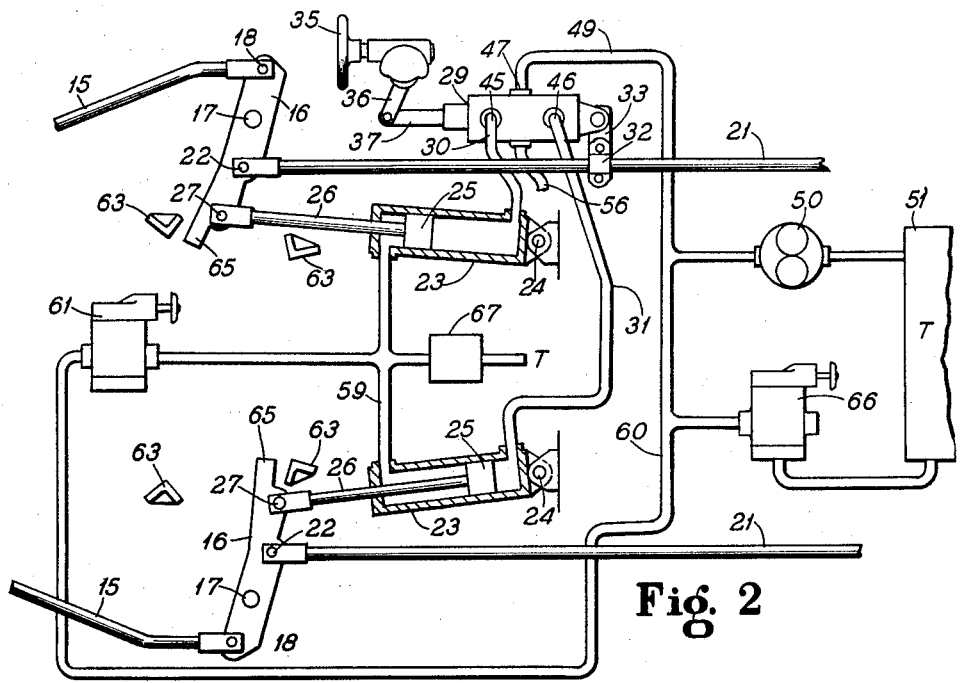
Figure 2 is a fragmentary diagrammatic view of the hydraulic steering system shown in Figure 1, showing the steering connections to the front steering wheels in the positions they will assume when the wheels are turned during steering operation.
Figure 3:
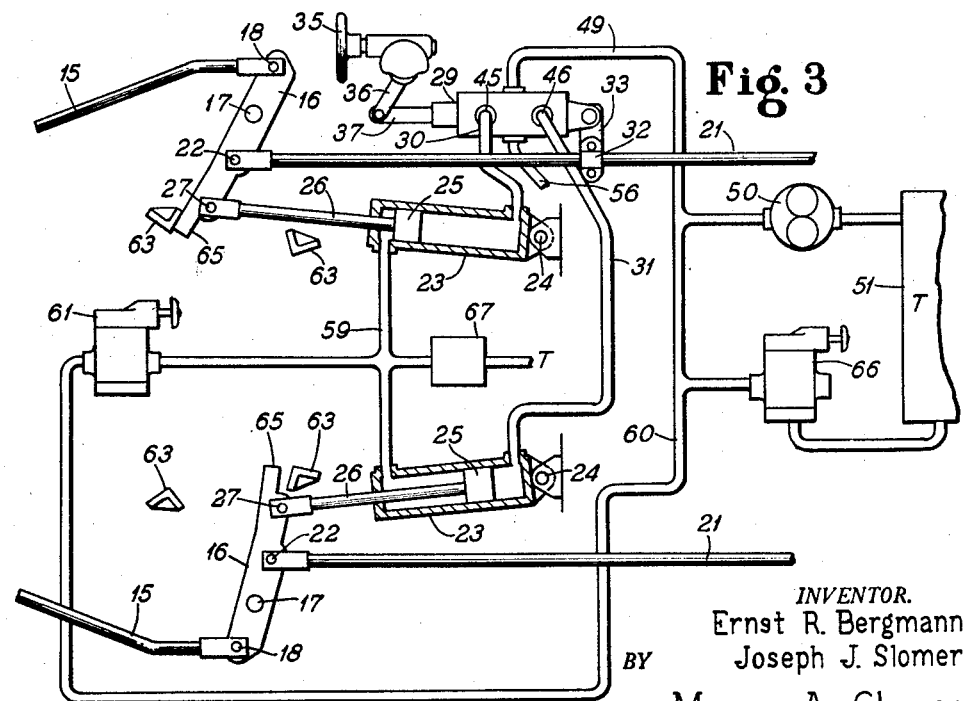
Figure 3 is a diagrammatic view of a steering system somewhat like Figure 2, but showing the steering linkages for the two wheels out of synchronism with respect to each other and illustrating the means for effecting automatic resynchronization of the wheels.

The positions of the steering linkages when hydraulic fluid under pressure is supplied to one cylinder 23 and released from the other cylinder 23 through the 4-way valve 29 are illustrated in Figure 2, and if no hydraulic fluid losses ever occurred the four wheels 10 and 11 would move together equal amounts. Where, however, oil leaks from the system in one way or another there will be insufficient hydraulic fluid in the piston rod ends of the cylinders 23 to effect movement of the two pistons 25 equal amounts in opposite directions, and the wheels on one side of the vehicle will swivel a greater amount than the wheels on the opposite side of the vehicle, as illustrated in Figure 3.

In order to remedy this condition a make-up line 60 is connected from the pressure line 49 and pump 50 to the tie tube 59. A relief valve 61 which may be a conventional form of relief valve is shown as being connected in the make-up line 60 to supply make-up fluid to the tie tube 59 to make up for fluid lost through leakage and to thereby correlate steering movement of the wheels 10 and 11 on each side of the vehicle, as will now be described.

Movement of the pistons 25 in either direction is limited by spaced stops 63 spaced equal distances on opposite sides of projecting end portions 65 of the steering levers 16 when the steering levers 16 are in the neutral position shown in Figure 1. When the wheels are turned for steering and reach the limit of turning movement thereof, and steering movement of the wheels on one side of the vehicle is out of synchronization with steering movement of the wheels on the opposite side of the vehicle, as the projecting portion 65 of one steering lever 16 comes into engagement with its limiting stop 63, pressure will be built up in the associated cylinder 23, the pressure line 49 and make-up line 60. As the pressure is built up to a predetermined value, the relief valve 61 will open to supply fluid under pressure to the tie tube 59. This will supply fluid under pressure to move the piston 25 and steering lever 16 on the opposite side of the vehicle from the piston which has reached its limit of travel, until the piston on the opposite side of the vehicle reaches its limit of travel in an opposite direction from the direction of movement of the piston which has already reached its limit of travel. The two wheels on each side of the vehicle will now be aligned and will move together in synchronism.

The relief valve 61 may be loaded to an extent sufficient to supply fluid under pressure through the make-up line 60 to the tie tube 59 only when the limit of movement of the piston on one side of the vehicle moving in advance of the oppositely moving piston on the opposite side of the vehicle is reached. In the present instance the relief valve 61 is loaded to supply fluid under pressure to the tie tube 59 as the pressure in the line 60 on the upstream side of the relief valve 61 is built up to 800 p.s.i.

A relief valve 67 is connected from the tie tube 59 to the tank 51, to return fluid to said tank after the compensation for difference in movement of the wheels on the two sides of the vehicle has been made and the pressure continues to rise.

The relief valve 67 relieves pressure from said tie tube where an excess of oil may become trapped in the tie tube 59. The relief valve 67 may be set to relieve fluid under pressure from the tie tube 59 when the pressure in said tie tube is in the order of 900 p.s.i., for example.

A main relief valve 66 may be provided between the pressure line 49 and the tank to provide an overall safety control for the entire system and, may, for example, be set to relieve at 1200 p.s.i.

It may be seen from the foregoing that a simplified and improved hydraulic steering system has been provided in which the conventional tie rod has been replaced by a hydraulic tie means in the form of a tie tube connecting the steering cylinders together to effect movement of the pistons therein equal distances in opposite directions, and that where fluid may be lost through leakage and one piston may lag behind the other, fluid is made up to the lagging piston through the make-up line 60 and relief valve 61, automatically supplying fluid under pressure to the make-up line as one wheel or the other reaches its limit of steering movement, effecting the building up of pressure in the make-up lines as pressure is supplied to the piston which has reached its limit of travel.

It should here be understood that with vehicles such as shuttle cars, that the car on nearly every trip turns corners of minimum radius requiring several 90° turns. Therefore, each time a minimum radius turn is made, the system compensates for any losses of hydraulic fluid, and thus resynchronizes itself.

Where, however, the vehicle may not make minimum radius turns and the wheels may move out of synchronism with respect to each other, they may be readily synchronized by turning the wheels to their limit of turning movement in one direction or the other.

While we have herein shown and described one form in which our invention may be embodied, it should be understood that various modifications of the invention may be effected without departing from the spirit and scope of the novel concepts thereof.

We claim as our invention:

1. In a hydraulic system, two hydraulic actuating devices mechanically independent of each other, means selectively operable to supply fluid under pressure to either of said actuating devices, means connecting said actuating devices together to effect actuating movement of said devices equal amounts in opposite directions upon the application of fluid under pressure to one actuating device comprising a hydraulic tie tube, and means having fluid connection with said tie tube and automatically operable by the pressure built up by movement of either of said devices to their limit of movement to supply make-up fluid to said tie tube to compensate for loss of fluid from the system.

2. In a hydraulic system, two hydraulic actuating devices mechanically independent of each other, valve means selectively operable to supply fluid under pressure to either of said actuating devices, means hydraulically connecting said actuating devices together to effect actuating movement of said actuating devices equal amounts in opposite directions upon the application of fluid under pressure to one actuating device comprising a hydraulic tie tube connecting said actuating devices together, means automatically operable to supply make-up fluid to said tie tube to compensate for loss of fluid from the system comprising means limiting actuating movement of either actuating device, and a valve in said make-up line operable by the pressure built up by the limiting of movement one actuating device, to supply make-up fluid to move the opposite actuating device to its extreme position of movement.

3. In a hydraulic equalizing system for effecting a working movement of two mechanically independent parts equal amounts in opposite directions, two cylinders having pistons therein, each piston having operative connection with one of said mechanically independent parts, a valve selectively operable to supply fluid under pressure to either of said cylinders at the same ends thereof, means limiting movement of said parts in either direction of movement thereof, a hydraulic tie tube connecting said cylinders together at the opposite ends thereof from the pressure inlet ends thereof, and pressure operated valve means operable by the pressure built up by movement of either of said parts to the limit of movement thereof for supplying make-up fluid under pressure to said tie tube to move the other of said parts to its limit of movement.

4. In a hydraulic equalizing system for effecting a working movement of two mechanically independent parts equal amounts in opposite directions, two cylinders having pistons therein, each piston having operative connection with one of said mechanically independent parts, a valve selectively operable to supply fluid under pressure to either of said cylinders at the same ends thereof, means limiting movement of said parts in either direction of movement thereof, a hydraulic tie tube connecting said cylinders together at the opposite ends thereof from the pressure inlet ends thereof, and means automatically operable by the pressure built up by movement of either of said parts to the limit of movement thereof for supplying make-up fluid under pressure to said tie tube to move the other of said parts to its limit of movement comprising a make-up pressure line having fluid pressure connection with said tie tube, and pressure operated valve means in said make-up pressure line operable upon the building up of pressure therein effected by the limiting of movement of either of said parts for supplying make-up fluid to said tie tube.

5. In a hydraulic equalizing system for effecting a working movement of two mechanically independent parts equal amounts in opposite directions, two cylinders having pistons therein, each piston having operative connection with one of said mechanically independent parts, a valve selectively operable to supply fluid under pressure to either of said cylinders at the same ends thereof, spaced stop means associated with each part for limiting movement of said parts in either direction of movement thereof, a hydraulic tie tube connecting said cylinders together at the opposite ends thereof from the pressure inlet ends thereof, and means operable by the pressure built up by movement of either of said parts into engagement with either of the stops therefor for supplying make-up fluid under pressure to said tie tube to move the other of said parts into engagement with either of said stops, comprising a pressure make-up line having fluid pressure connection with said tie tube, and pressure operated valve means in said pressure make-up line operable by the building up of fluid under pressure in said pressure make-up line by the continued application of fluid under pressure to the piston moving its associated part into engagement with an associated stop, and a relief valve for relieving pressure from said make-up line upon the synchronization of each of said mechanically independent parts.

6. In a power steering system particularly adapted for shuttle cars and the like having independent steering wheels, a cylinder and piston having association with each steering wheel for turning the same for steering, a power steering valve for selectively supplying fluid under pressure to either of said cylinders at the same ends thereof, and means compensating for leakage from the system to maintain said wheels in alignment comprising a tie tube connecting said cylinders together at the opposite sides of said pistons from the fluid pressure connections thereto and means having fluid connection with said tie tube and automatically operable by the pressure built up by movement of either of said devices to their limit of movement to supply make-up fluid to said tie tube as steering movement of one wheel lags behind the other.

7. In a power steering system particularly adapted for shuttle cars and the like, having independent steering wheels, a cylinder and piston having association with each steering wheel for turning the same for steering, a power steering valve for supplying fluid under pressure to the same ends of either of said cylinders, a tie tube connecting the opposite ends of said cylinders together to effect movement of said pistons in opposite directions upon the supply of fluid under pressure to one of said cylinders, and means automatically operable by the pressure built up by movement of either of said devices to their limit of movement to supply make-up fluid to said tie tube to effect movement of said pistons equal amounts in opposite directions comprising a make-up pressure line having fluid connection with said tie tube and a valve in said line automatically operable by the building up of a predetermined amount of pressure in the cylinder to which fluid is supplied, for supplying fluid under pressure to said tie tube.

8. In a power steering system particularly adapted for shuttle cars and the like, having independent steering wheels, a separate cylinder and piston having connection with each wheel, for turning the same for steering, a power steering valve for supplying fluid under pressure to either of said cylinders at the same ends of each of said cylinders, and means compensating for leakage from the system to effect movement of said pistons equal amounts in opposite directions upon the supply of fluid under pressure to one of said cylinders to maintain said wheels in alignment, comprising a tie tube connecting said cylinders together on the opposite sides of said pistons from the fluid pressure connections thereto, stop means limiting steering movement of the wheel actuated by the cylinder to which pressure is applied, a make-up line having a pressure operated valve therein and having fluid pressure connection with said tie tube and supplying fluid under pressure thereto upon the building up of pressure by movement of one of said wheels into engagement with said stop means.

9. In a power steering system particularly adapted for shuttle cars and the like having independent front steering wheels, a cylinder and piston having association with each wheel for turning the same for steering, a source of supply of fluid under pressure, a power steering valve connected with said source of supply of fluid under pressure for supplying fluid under pressure to either of said cylinders at the same ends thereof to effect movement of the pistons therein in the same direction, a tie tube connecting the opposite ends of said cylinders together to effect movement of one piston in an opposite direction from the other upon the admission of fluid under pressure to one cylinder, and means compensating for leakage by either of said pistons to maintain the associated wheels in synchronization during steering movement thereof, comprising stop means associated with each wheel for limiting movement of each wheel in either direction of steering movement thereof, and a make-up line connected between the inlet side of said power steering valve and said tie tube and having a pressure operated valve therein, said make-up line having fluid pressure connection with said tie tube for automatically supplying fluid under pressure to said tie tube as pressure is built up by the movement of one of said wheels to the limit of movement thereof as determined by said stop means.

10. In a power steering system particularly adapted for shuttle cars and the like having independent front steering wheels, a cylinder and piston having association with each wheel for turning the same for steering, a source of supply of fluid under pressure, a power steering valve connected with said source of supply of fluid under pressure for supplying fluid under pressure to either of said cylinders at the same ends thereof to effect movement of the pistons therein in the same direction, a tie tube connecting the opposite ends of said cylinders together to effect movement of one piston in an opposite direction from the other upon the admission of fluid under pressure to one cylinder, and means compensating for leakage by either of said pistons to maintain the associated wheels in synchronization during steering movement thereof, comprising stop means associated with each wheel for limiting movement of each wheel in either direction of steering movement thereof, a make-up line having connection with said power steering valve on the inlet side thereof, a pressure operated valve in said make-up line supplying fluid under pressure to said tie tube by the building up pressure on the inlet side of said power steering valve effected by the movement of one of said steering wheels to the limit of movement thereof as determined by the associated stop means, and a relief valve relieving pressure from said make-up line upon synchronization of said wheels.

References Cited in the file of this patent

UNITED STATES PATENTS

| | | |
|---|---|---|
| 1,953,742 | Bunch et al. | Apr. 3, 1934 |
| 2,111,668 | Latzen | Mar. 22, 1938 |
| 2,163,892 | Sanford et al. | June 27, 1939 |
| 2,178,073 | Hardy | Oct. 31, 1939 |
| 2,358,236 | Lee | Sept. 12, 1944 |
| 2,506,093 | MacDuff | May 2, 1950 |
| 2,555,649 | Krotz | June 5, 1951 |
| 2,567,074 | Kupiec | Sept. 4, 1951 |
| 2,761,693 | Stover | Sept. 4, 1956 |